United States Patent
Lee et al.

(10) Patent No.: US 8,527,661 B1
(45) Date of Patent: Sep. 3, 2013

(54) GATEWAY FOR CONNECTING CLIENTS AND SERVERS UTILIZING REMOTE DIRECT MEMORY ACCESS CONTROLS TO SEPARATE DATA PATH FROM CONTROL PATH

(75) Inventors: Whay Sing Lee, Milpitas, CA (US); Richard W. Meyer, Redwood City, CA (US); Charles D. Binford, Wichita, KS (US); Rodney A. Dekoning, Wichita, KS (US); William Stronge, Westford, MA (US)

(73) Assignee: Oracle America, Inc., Redwood City, CA (US)

( * ) Notice: Subject to any disclaimer, the term of this patent is extended or adjusted under 35 U.S.C. 154(b) by 2953 days.

(21) Appl. No.: 11/076,315

(22) Filed: Mar. 9, 2005

(51) Int. Cl.
  *G06F 15/16* (2006.01)
(52) U.S. Cl.
  USPC .......................... 709/249; 709/217; 709/218
(58) Field of Classification Search
  USPC ........................................................ 709/249
  See application file for complete search history.

(56) References Cited

U.S. PATENT DOCUMENTS

| | | | | |
|---|---|---|---|---|
| 5,884,025 A * | 3/1999 | Baehr et al. | | 726/13 |
| 6,687,251 B1 * | 2/2004 | Mousseau et al. | | 370/401 |
| 7,506,073 B2 * | 3/2009 | Kuik et al. | | 709/249 |
| 7,526,572 B2 * | 4/2009 | Omar et al. | | 709/246 |
| 7,590,759 B2 * | 9/2009 | Omar et al. | | 709/246 |
| 2004/0078419 A1 * | 4/2004 | Ferrari et al. | | 709/201 |
| 2005/0120141 A1 * | 6/2005 | Zur et al. | | 709/249 |
| 2006/0013251 A1 * | 1/2006 | Hufferd | | 370/466 |
| 2006/0149811 A1 * | 7/2006 | Bennett et al. | | 709/203 |
| 2006/0155814 A1 * | 7/2006 | Bennett et al. | | 709/207 |

* cited by examiner

*Primary Examiner* — Jeffrey Nickerson
(74) *Attorney, Agent, or Firm* — Marsh Fischmann & Breyfogle, LLP; Kent A. Lembke

(57) ABSTRACT

A network system gateway and method providing remote direct memory access controls to separate data path from control path. Control operations are passed between the gateway and a control processor node, and data is passed between the gateway and a memory node via remote direct memory access operations. The memory node may also receive instructions for the remote direct memory access operations through proxy remote direct memory access messages received from the control processor node.

17 Claims, 7 Drawing Sheets

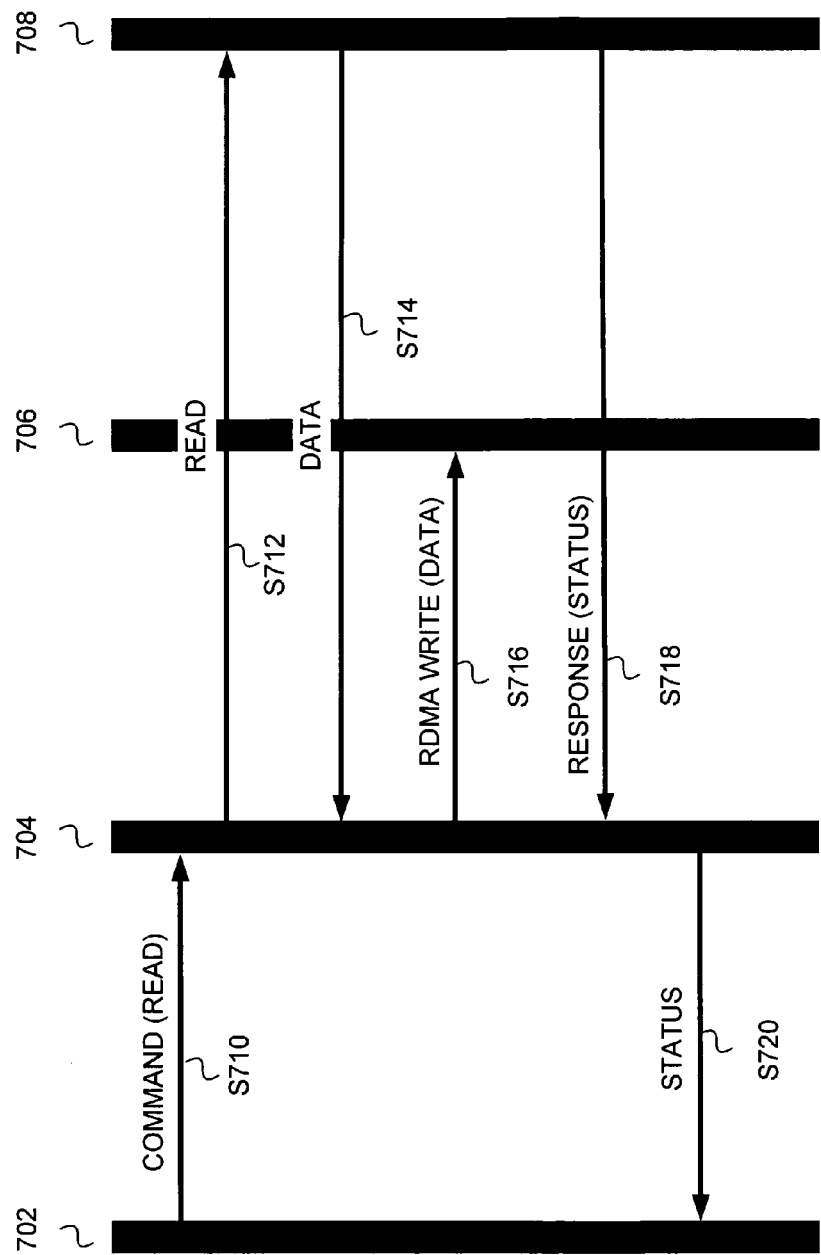

GATEWAY FOR CONNECTING CLIENTS AND SERVERS UTILIZING REMOTE DIRECT MEMORY ACCESS CONTROLS TO SEPARATE DATA PATH FROM CONTROL PATH

BACKGROUND OF THE INVENTION

1. Field of the Invention

The present invention relates to a networking system and method and more particularly to a networking system including a gateway utilizing remote direct memory access controls for separating data path from control path when reading and writing data.

2. Description of Related Art

Various networking systems are currently available, many of which are combined to create larger integrated systems. Many networking systems use differing communication methods and protocols. For example, Ethernet is an industry standard, highly scalable, high performance interconnection fabric, which may be used to connect together a large number of nodes performing a variety of functions. One such function is as a scalable data storage server that accepts data storage commands from storage clients and performs a variety of transforms on such commands and subsequently issues derived data storage commands to storage devices such as disk drives.

The interface used to request block storage services for most networks is the Small Computer Systems Interface, or SCSI. SCSI is a client-server architecture and a SCSI transport maps the client-server SCSI protocol to a specific interconnect. One such SCSI transport is Internet SCSI, or iSCSI. iSCSI is a mapping of the SCSI remote procedure call over the Transmission Control Protocol (TCP).

The SCSI layer builds and receives SCSI CDBs (Command Descriptor Blocks) and passes/receives them and their parameters to/from the iSCSI layer. The iSCSI layer builds/receives iSCSI PDUs (Protocol Data Unit) and relays them to/from one or more TCP connections. One or more TCP connections that link an initiator with a target form a session. Connections within a session are identified by a CID (connection ID). Sessions are identified by the SID (session ID). For any iSCSI request issued over a TCP connection, the corresponding response and/or other PDUs must be sent over the same connection. This is called command connection allegiance. Thus, if an initiator sends a READ command, the target must send the requested data and the status to the initiator over the same TCP connection that was used to deliver the SCSI command.

iSCSI Extensions for RDMA (iSER) provides a Remote Direct Memory Access ("RDMA") capability to iSCSI by layering iSCSI on top of Remote Direct Memory Access Protocol (RDMAP). RDMAP permits data to be transferred directly in and out of buffers without intermediate data copy operations.

The interconnection between a storage client or storage device and a storage server system, such as an Ethernet network, may be of a different type of interconnection fabric. For example, storage client networks, as well as storage device networks, may be made up of a Fiber Channel interconnection fabric. Various standard protocols do not provide effective connectivity from one interconnection fabric, such as a Fiber Channel based client or storage device, to a storage server constructed of another interconnection fabric, such as Ethernet.

Furthermore, communications within standard protocols, whether they include data or commands, are transferred via the same channel. For example, InfiniBand networks might use SCSI over RDMA Protocol ("SRP") and RDMA channels to transfer SCSI commands and data blocks. According to the industry standard SRP definition, an SRP command, its corresponding RDMA operations, and the corresponding SRP response, must all be transferred via the same RDMA channel. This is the same restriction placed on iSCSI over Ethernet networks. Thus, translation capabilities between interconnection fabrics and the protocols used in handling the communications between various systems limit the functional capabilities of each system, as well as a system designer's ability to efficiently scale a network, develop performance enhancements or other system efficiencies.

These and other deficiencies exist in current networked data storage server systems. Therefore, a solution to these and other problems is needed to provide a data storage server system capable of transmitting data information and command information over separate data paths to separate nodes.

SUMMARY OF THE INVENTION

Accordingly, the present invention is directed to a network system gateway and method. The objectives and other advantages of the invention will be realized and attained by the structure particularly pointed out in the written description and claims hereof, as well as the appended drawings.

Thus, the present invention provides a networking system gateway and a remote direct memory access concept enabling the separation of data and control paths. Accordingly, a data cache node, physically separate from a control processor node, may be used to contain user data as it is being transferred between a front-side gateway and a back-side gateway of a data storage server system. The networking system gateways also manage the communication and transfer of data between a server system interconnection fabric and connections from client and storage device networks.

Furthermore, the present invention provides scalability and simplicity of operation. Through the incorporation of one or more front-side gateways and one or more back-side gateways a networking system can be scaled according to its requirements. Simplicity is obtained by separating data and control paths to allow a processor to manage the flow of data through multiple front-side gateways, back-side gateways, and/or cache modules without expending its own resources in receiving, storing, and sending data. Accordingly, a bottleneck in the flow of data to a single processor may be removed.

In accordance with one embodiment of the present invention, a networking system for processing direct memory operations to separate data and control paths is provided that includes a gateway node, a control processor node, a data cache node, and communication paths for communicating control packets, proxy remote direct memory access packets, and remote direct memory access packets. The gateway node receives and responds to data requests, translates a received data request to a data command, and initiates remote direct memory operations. The control processor node initiates proxy remote direct memory access operations based on the data command received from the gateway node. The data cache node stores data and responds to the proxy remote direct memory access operations initiated by the control processor node. Control operations are managed through one or more control packets generated according to the data request received by the gateway and are passed between the gateway node and the control processor node. Proxy remote direct memory access operations are managed through one or more proxy remote direct memory access packets passed between the control processor node and the data cache node. And direct memory access operations are managed through one or more direct memory access data packets passed between the data cache node and the gateway node.

In accordance with another embodiment of the present invention, a networking system for processing remote direct memory access operations is disclosed and includes a gateway means for communicating control information, and conducting remote direct memory access operations, a processor means for communicating control information with the gateway means and communicating proxy remote direct memory access operations, and a data storage means for storing data, conducting proxy remote direct memory access operations with the processor means, and conducting remote direct memory access operations with the gateway means.

In a further embodiment of the present invention, a method for processing a data write request is provided that includes the steps of receiving a write request for writing data to a memory module, converting the write request to a write command, passing the write command to a processing module, generating a proxy remote direct memory access read command based upon the write command received by the processing module, passing the proxy remote direct memory access read command to the memory module, passing a remote direct memory access read request to a gateway module requesting data specified by the remote direct memory access read command, responding with the specified data to the memory module with a remote direct memory response message, responding to the processing module with a proxy remote direct memory access response, and sending a status response to the gateway module indicating the result of the step of responding with the specified data.

In a further embodiment of the present invention, a method for processing a data read request is provided that includes the steps of receiving a read request for reading specified data from a memory module, converting the read request to a read command, passing the read command to a processing module, generating a proxy remote direct memory access write command based on the read command received by the processing module, passing the proxy remote direct memory access write command to the memory module, writing data specified by the proxy remote direct memory access write command with a remote direct memory access write command to a gateway module, responding to the processing module with a proxy remote direct memory access response indicating the status of the remote direct memory access write command, and responding to the gateway module with a status response indicating the status of the remote direct memory access write command.

In a further embodiment of the present invention, a method for processing a data write request is provided that includes the steps of receiving a write command for writing data to a storage device, converting the write command to a write request, passing the write request to the storage device, responding to the write request with a transfer ready message, generating a remote direct memory access read request based upon the write command received, passing the remote direct memory access read request to a memory module, responding with a remote direct memory access read response including the data specified by the remote direct memory access read request, passing the data to the storage device, responding with a status response message, and passing a status response to the control module indicating the result of the step of passing the data to the storage device.

In another embodiment of the present invention, a method for processing a data read request is provided that includes the steps of receiving a read command for reading data from a storage device, converting the read command to a read request, passing the read request to the storage device, responding to the read request with the data, passing the data to a memory module with a remote direct memory access write command, responding with a status response message, and passing a status response to the control module indicating the result of the step of passing the data to the memory module.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the invention are incorporated in and constitute a part of this specification, illustrate embodiments of the invention and together with the description serve to explain the principles of the invention. In the drawings:

FIG. 7 is a flow diagram showing a method for reading data from a storage device according to an embodiment of the present invention.

DETAILED DESCRIPTION OF VARIOUS EMBODIMENTS

Reference will now be made in detail to various embodiments of the present invention, examples of which are illustrated in the accompanying drawings.

Figure 1:
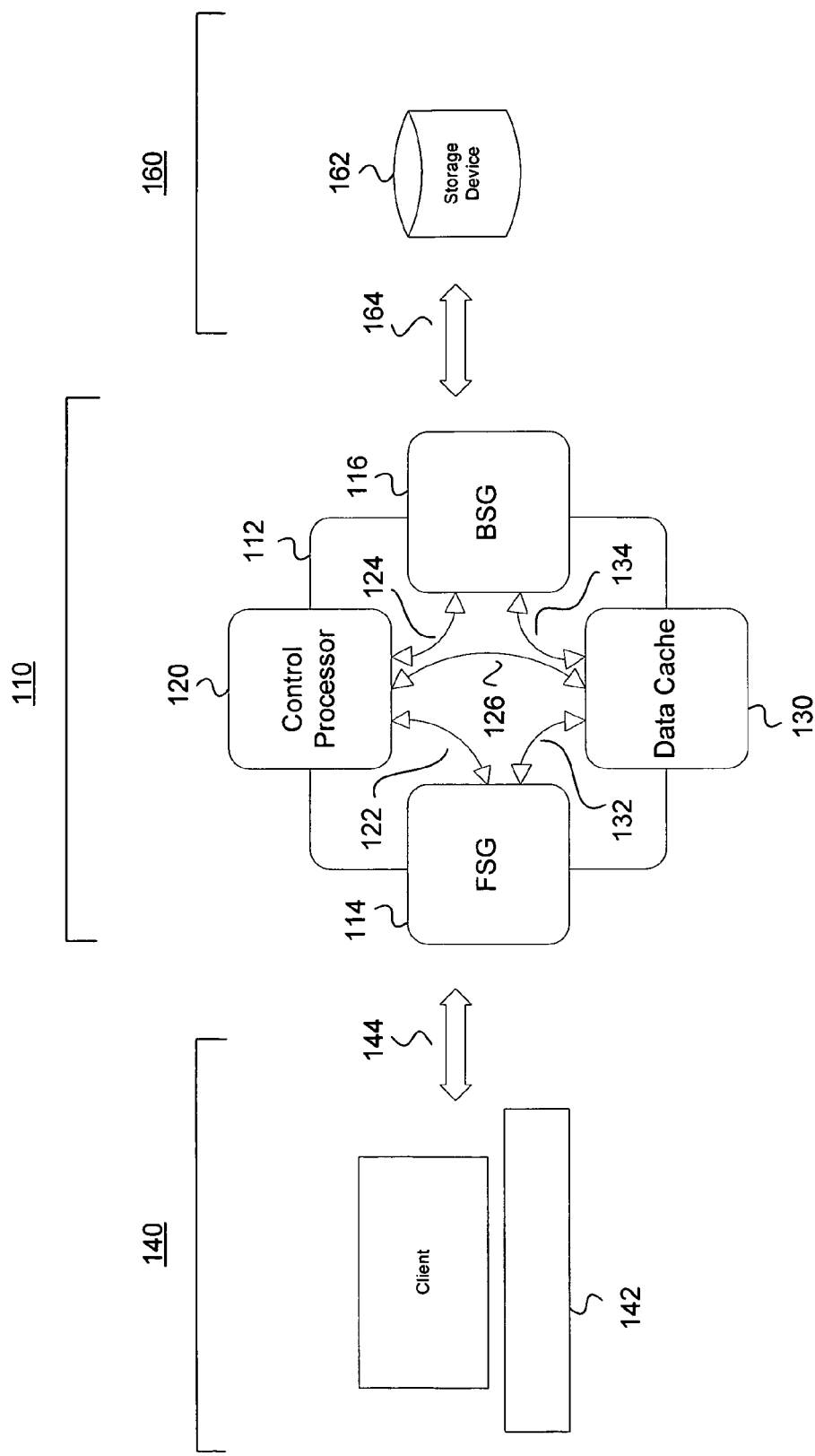
FIG. 1 shows a data storage server system, including control and data cache nodes, a front-side gateway node connected to a client system, and a back-side gateway node connected to a data storage system in accordance with an embodiment of the present invention.

FIG. 1 shows a server system 110 interconnected with a client system 140, and a data storage system 160 in accordance with an embodiment of the present invention. It can be appreciated by those skilled in the art that server system 110 could be any type of server system and client system 140 could be any type of client based system. For ease of reference, however, server system 110 will be referred to as a data storage server system and client system 140 will be referred to as a storage client system.

In FIG. 1, the data storage server system 110 is made up of various nodes, including one or more control processor nodes 120, one or more data cache nodes 130, one or more front-side gateway nodes ("FSG") 114, and one or more backside gateway nodes ("BSG") 116. The nodes are clustered or connected through an interconnection fabric 112. According to an embodiment of the present invention, during read and write operations various communication pathways 122, 124, 126, 132, and 134 are established within the interconnection fabric 112 to allow the passing of control and data packets among the various nodes 114, 116, 120, and 130.

FIG. 1 also shows a storage client system 140 that includes one or more storage clients 142 that access the data storage server system 110 through interconnection fabric 144. The FSG 114 of the storage server system 110 provides a translation mechanism for communicating with storage client 142.

FIG. 1 also shows a data storage system 160 that includes one or more storage devices 162, which are accessed by the data storage server system 110 through interconnection fabric 164 and BSG 116. The BSG 116 of the data storage server system 110 provides a translation mechanism for communicating with the storage device 162.

During read and write requests initiated by the storage client 142, the FSG 114 acts as a target of the request. The FSG 114 then initiates communication with the control processor node 120 and data cache node 130 within the data storage server system 110. Furthermore, the FSG 114 acts as a responder to remote direct memory access communications originated by the control processor and data cache nodes 120 and 130. Communication between the control processor and data cache nodes 120 and 130 is handled with proxy remote direct memory access commands through one or more communication channels 126 established within the interconnection fabric 112. Remote direct memory access operations are physically processed between the FSG 114 and the data cache node 130. The proxy remote direct memory access commands and responses allow the control processor node 120 to control and monitor the remote direct memory access operations between the gateway and a data cache node.

During communications between a storage client 142 and the FSG 114, data paths 122 and 132 are established between the FSG 114 and the nodes 120 and 130 providing storage server functionality within the data storage server system 110. Control packets travel across one or more pathways 122 to the control processor node 120 and data packets travel across one or more pathways 132 to the data cache node 130.

Similarly, during communications between the BSG 116 and the storage device 162, data paths 124 and 134 are established between the BSG 116 and the nodes 120 and 130 handling the storage server functionality within the data storage server system 110. Control packets travel across one or more pathways 124 and data packets travel across one or more pathways 134.

In one embodiment of the present invention, the separation of the data path and control path is accomplished by the control processor node 120 generating a proxy remote direct memory access request to the data cache node 130 involved in the transfer of data.

In another embodiment utilizing an Ethernet interconnection fabric, the proxy remote direct memory access command conveys an R-STag (identifying a named buffer and access privileges), a Transfer Offset (TO) (identifying the number of bytes from the base of named buffer), and Transfer Length (identifying the length of memory to be used) values pertaining to the FSG 114, as well as L-STag (identifying the named buffer and access privileges), and TO values (identifying the number of bytes from the base of the named buffer) pertaining to the data cache node 130. The tuple {R-STag, TO, Transfer Length} is obtained from the command originally sent by the FSG 114 to the control processor node 120.

According to a further embodiment of the present invention, TCP sessions are logically associated with the nodes 114, 116, 120, and 130 of the data storage server system 110. Accordingly, a direct-memory-access session identifier ("DMA SID") may also be passed with the proxy remote direct memory access request for handling the remote direct memory access operations between the FSG 114 and the data cache node 130. The DMA SID identifies a session and connection between the data cache node 130 and the FSG 114. Using the DMA-SIDs, the control processor node 120 instructs the data cache node 130 to issue a remote direct memory access request into a particular connection, thereby causing the data cache node 130 to conduct a remote direct memory operation with the FSG 114.

In another embodiment utilizing an Infiniband interconnection fabric, the proxy remote direct memory access command conveys R-key, Remote Virtual Address, Transfer Length values pertaining to the access privileges, memory start location, and memory length of the FSG 114, as well as L-key, and Local Virtual Address values pertaining to the access privileges and memory start location of the data cache node 130. The tuple {R-key, Remote Virtual Address, Transfer Length} is obtained from the command originally sent by the FSG 114 to the control processor node 120.

According to a further embodiment of the present invention, QP structures are logically associated with nodes 114, 116, 120, and 130 of the data storage server system 110. Accordingly, a direct-memory-access qp-identifier ("DMA QPID") may also be passed with the proxy remote direct memory access request for handling the remote direct memory operations between the FSG 114 and the data cache node 130. The DMA QPID identifies a qpair between the data cache node 130 and the FSG 114. Using the DMA-QPIDs, the control processor node 120 instructs the data cache node 130 to issue a remote direct memory request into a particular qpair, thereby causing the data cache node 130 to conduct a remote direct memory operation with the FSG 114.

It can be appreciated by one skilled in the art that a variety of networking systems may be assembled to form a system as disclosed in FIG. 1. For example, one embodiment of the present invention includes a storage client system 140 made up of storage clients 142 running on a Fiber Channel (FC) interconnection fabric 144 with communications carried by the SCSI storage protocol ("FCP"). The storage server system 110 of this embodiment may be an Ethernet based storage server using a iSCSI over RDMA Protocol ("iSER") to carry SCSI traffic within the Ethernet fabric. In a system combining various networking systems, the FSG 114 may also be used to translate communications between the various systems.

According to an embodiment of the present invention, the FSG 114 acts as an FCP target as it relates to the FCP storage clients, as well as an iSCSI initiator as it relates to the control processor node 120 of the storage server system 110. Accordingly, the control processor node 120 take the role of iSCSI targets. The FSG 114 also acts as an RDMA responder with regard to its interaction with the control processor node 120, here referred to as the iSCSI target, while the iSCSI target itself acts as an RDMA originator.

According to an embodiment of the present embodiment, when the iSCSI target, e.g., control processor node 120, receives an iSCSI command from the FSG 114, instead of initiating any requisite RDMA requests, it instructs the data cache node 130 with a Proxy RMDA message to send an RDMA request to the FSG 114. When the necessary data transfers between the FSG 114 and the data cache node 130 are finished, the data cache node 130 returns a proxy RDMA response confirmation message to the control processor node 120 indicating whether the RDMA operation completed successfully. Based on this information the control processor node 120 returns an appropriate iSCSI response to the FSG 114, which then relays the status information to the FCP storage client 142.

In a further embodiment, a Proxy RDMA message is sent to the data cache node 130 for each iSCSI command, indicating the {R-STag, TO, Transfer Length} to be used with the FSG 114 in the corresponding RDMA operation, as well as a similar tuple specifying the memory location to be used within the data cache node 130 for the transfer. In another embodiment, the data cache node 130 may choose to perform the transfer using multiple distinct RDMA operations, for example, when large data transfers are required.

In a further embodiment, data cache node 130 may be distributed across the storage server system 110. In such a system, the iSCSI target may issue multiple proxy RDMA requests, if the iSCSI command requires data transfer to be conducted between the FSG 114 and the multiple cache node 130.

In another embodiment the iSCSI target, control processor node 120, must issue the Proxy RDMA requests to the data cache node 130 in the correct order to ensure that the corresponding RDMA requests to the FSG 114 are issued in the order of increasing virtual address. This embodiment allows the FSG 114 to be able to pipeline the data bursts between the FCP and Ethernet fabrics. For example, if a first data cache node and a second data cache node are responsible for fetching from virtual addresses 100 and 200 of the FSG 114, the SCSI target must ensure that the second data cache node issues its RDMA request to the FSG only after the first data cache node has completed its transfer of data. For this reason, the SCSI target would not send a Proxy RDMA message to the second data cache node until it has received a Proxy RDMA response from the first data cache node.

In a further embodiment where there are multiple communication paths established between a gateway node 114 and a data cache node 130, the control processor node 120 is charged with balancing data movement between the nodes. Accordingly, the control processor node 120, based on an appropriate algorithm, selects the communications path for each remote direct memory operation.

Communication between the server system 110 and storage device 162 is processed through the BSG 116. In one embodiment, data is written to the storage device 162 when the BSG 116 receives a write command from an initiator node, such as control processor node 120, instructing the BSG 116 to write data to the data storage device 162. Upon receipt of the write command, the BSG 116 translates the write command as necessary and issues a write command to storage device 162. Data storage device 162 responds to the write command with a transfer ready response when it is ready to receive data. Upon receipt of the transfer ready response, the BSG 116 issues a remote direct memory access read request to the memory node, such as data cache node 130, containing the data to be transferred to data storage device 162. The memory node responds to the BSG 116 with a remote direct memory access read response containing the requested data. BSG 116 then writes the data to storage device 162. Data storage device 162 returns a status response to the BSG 116, including the result of the data transfer. In turn, the BSG 116 sends a status message to the initiator node informing it of the status of the data transfer between the BSG 116 and the data storage device 162.

In a further embodiment, data is read from the storage device 162 when the BSG 116 receives a read command from an initiator node, such as control processor node 120, instructing the BSG 116 to read data from the data storage device 162. Upon receipt of the read command from the initiator, the BSG 116 translates the command as necessary and issues a read command to storage device 162. In turn, the data storage device responds with the data. Upon receipt of the data, the BSG 116 issues a remote direct memory access write request with the data to the memory node, such as data cache node 130, where the data is to be stored within storage server system 110. Storage device 162 also responds to the BSG 116 with a status response, including the result of the data transfer. The BSG 116 then sends a status message to the initiator node informing it of the status of the data transfer. As with the transfer of data through the FSG 114, a single data transfer through the BSG 116 may be separated into smaller transfers to accommodate system requirements by using multiple read or write commands to transfer the data.

Figure 2:
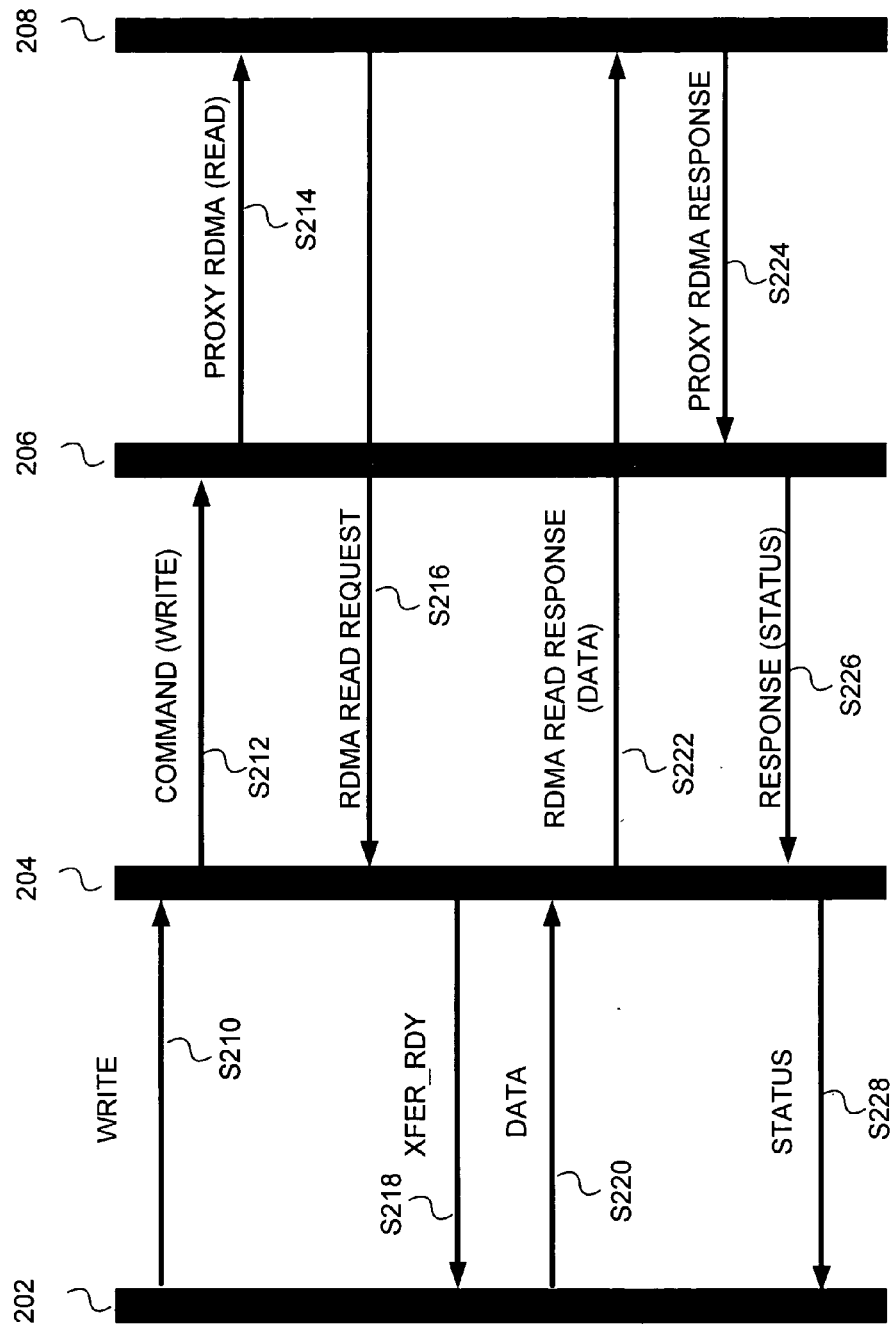
FIG. 2 is a flow diagram showing a method for writing data to a memory module by passing control and data packets over separate communications paths according to an embodiment of the present invention.
Figure 3:
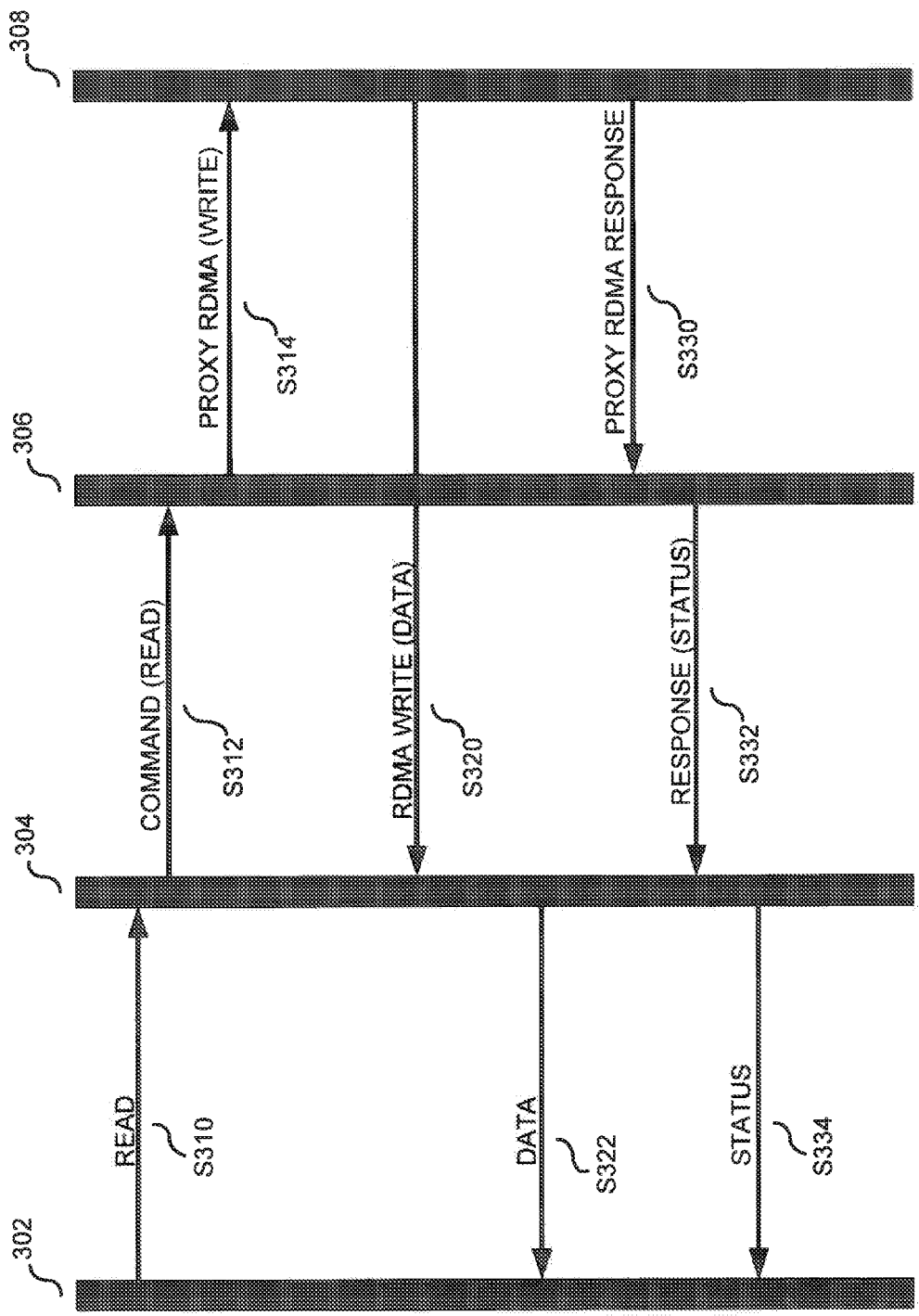
FIG. 3 is a flow diagram showing a method for reading data from a memory module by passing control and data packets over separate communications paths according to an embodiment of the present invention.
Figure 4:
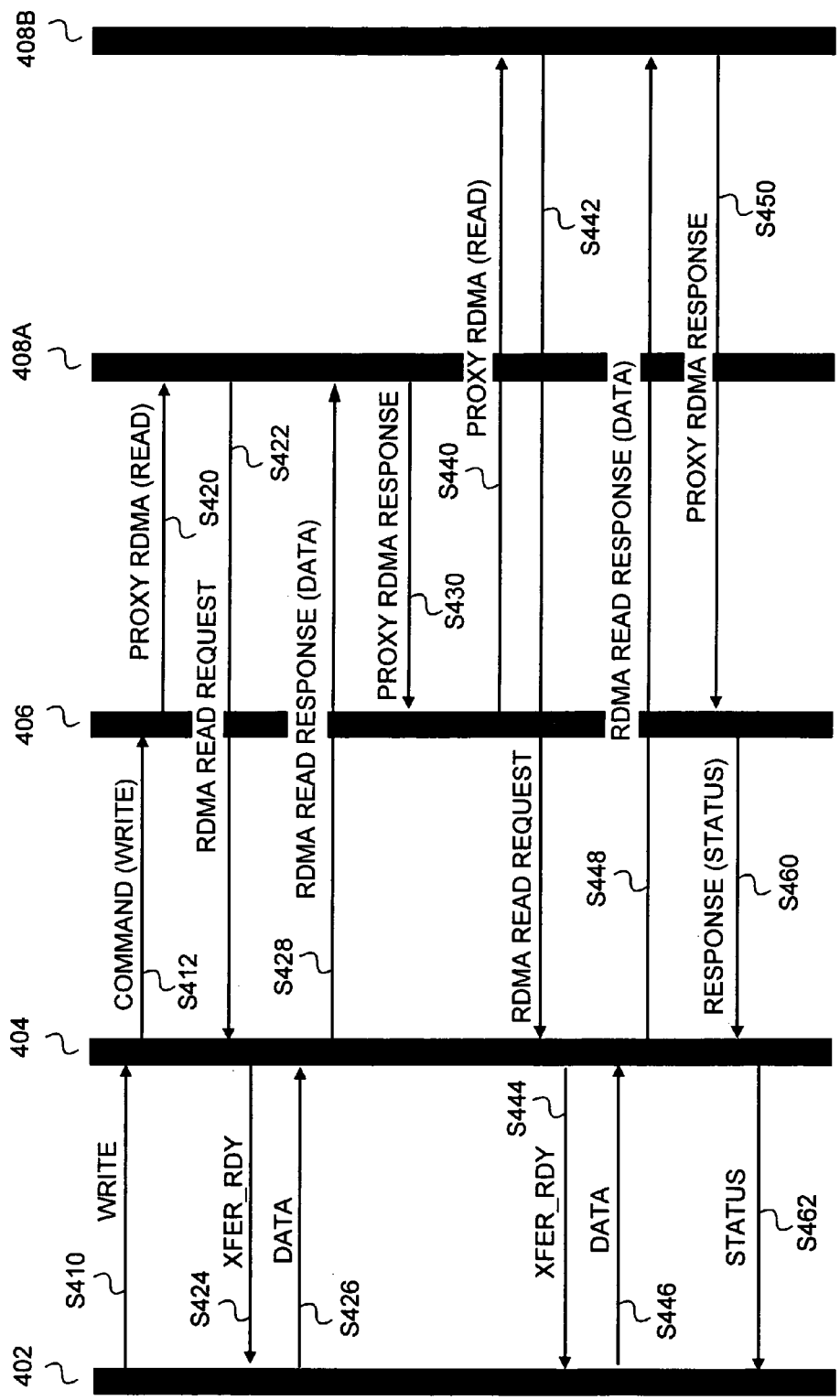
FIG. 4 is a flow diagram showing a method for writing data to multiple memory modules by passing control and data packets over separate communications paths according to an embodiment of the present invention.
Figure 5:
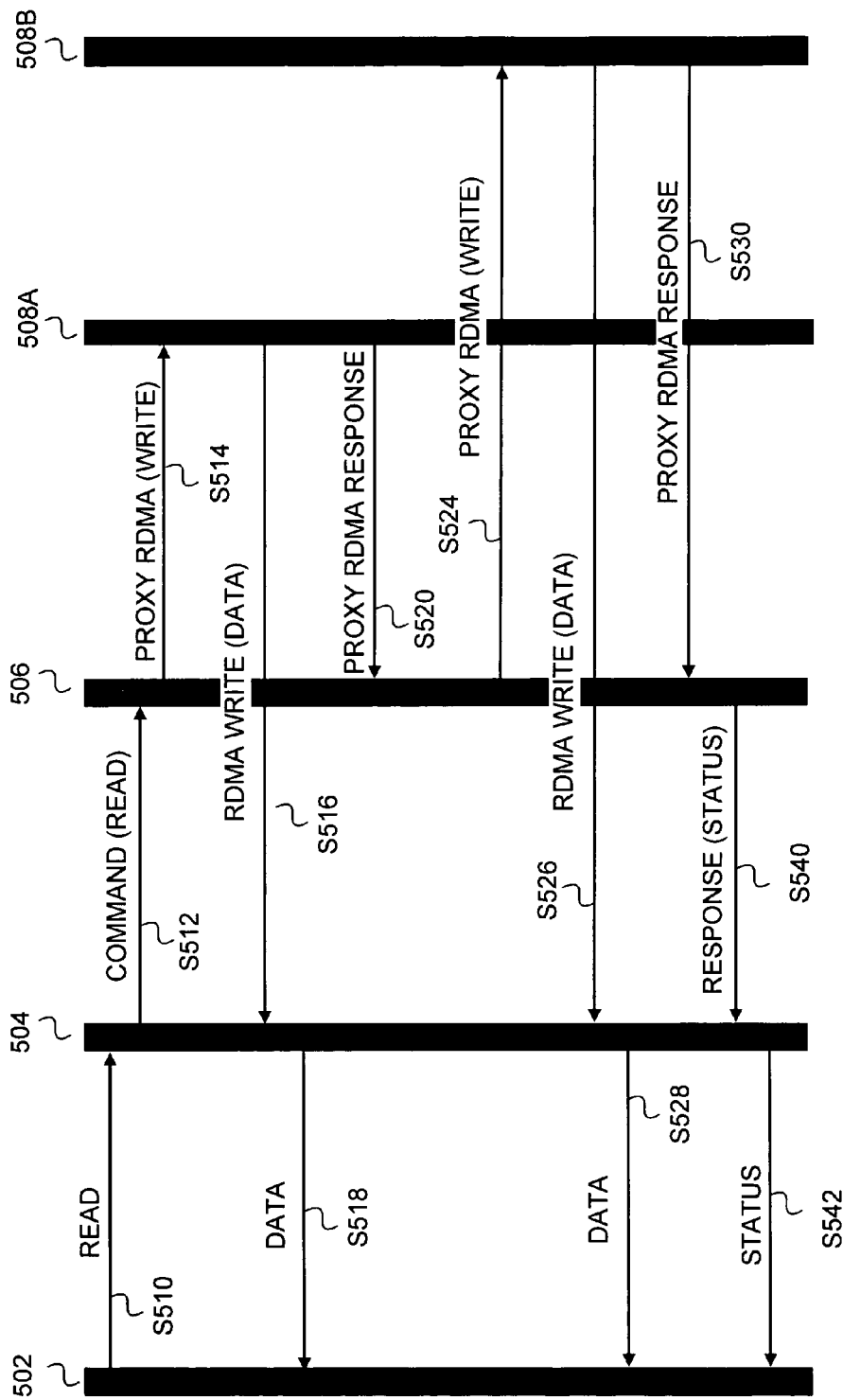
FIG. 5 is a flow diagram showing a method for reading data from multiple memory modules by passing control and data packets over separate communications paths according to an embodiment of the present invention.
Figure 6:
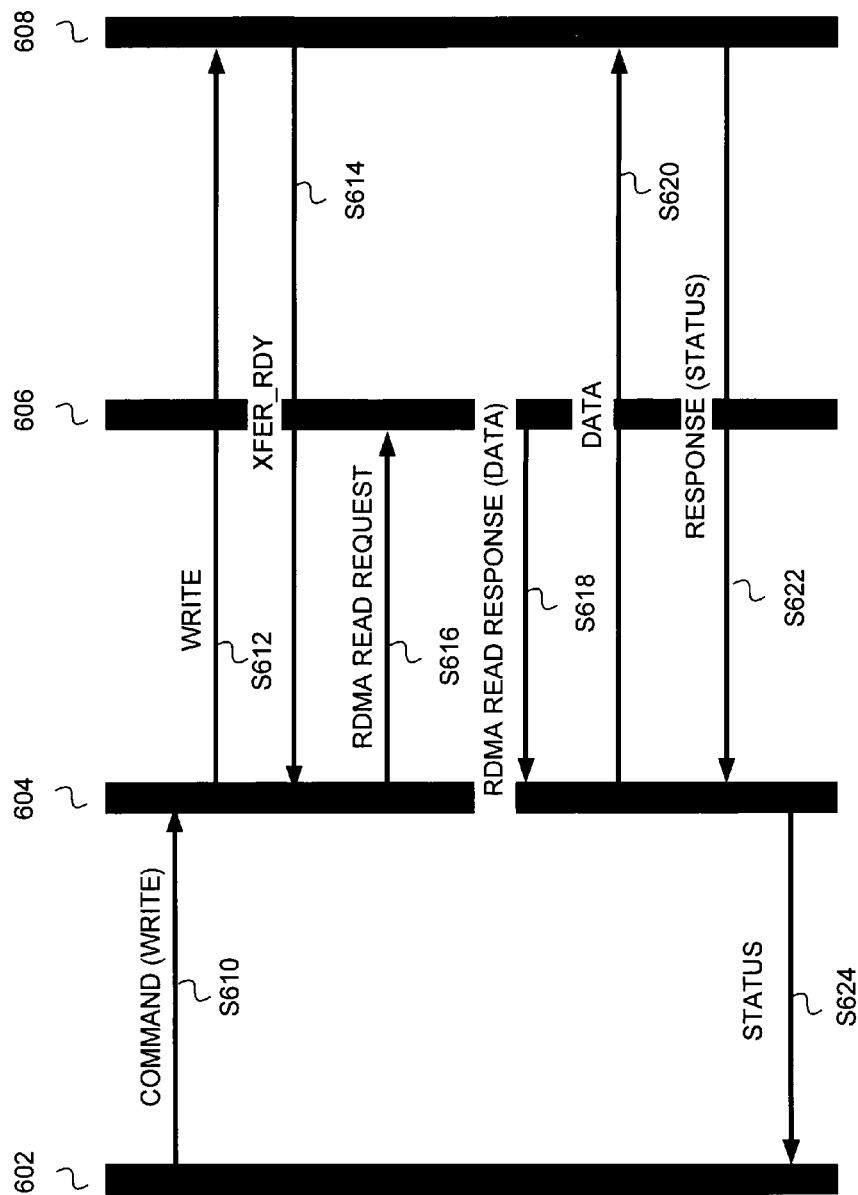
FIG. 6 is a flow diagram showing a method for writing data to a storage device according to an embodiment of the present invention.

As shown in FIGS. 2-7, the invention also provides a method for reading and writing data where control packets and data packets are passed through different communication paths to different modules within a network acting as a storage server. The methods for reading and writing data to one memory module according to the present invention are shown in FIGS. 2 and 3. The methods for reading and writing data to more than one memory module according to the present invention are shown in FIGS. 4 and 5. The methods for reading and writing data to a storage device according to the present invention are shown in FIGS. 6 and 7.

Turning to FIG. 2, a flow diagram is provided showing a method for writing data to a memory module, such as a data cache node, by passing control and data packets over separate communication paths according to an embodiment of the present invention. The process of writing data begins with step S210 when a first module 202, such as a storage client, initiates a write operation by sending a write request to a second module 204, such as an FSG. In step S212, the second module translates the write request, if necessary, and initiates a write command. In step S214, a third module 206, such as a data control processor, sends a proxy remote direct memory access read message instructing a memory module 208, such as a data cache node, to send a request to the second module 204 for the data. In step S216, the memory module 208 sends a remote direct memory read request to the second module 204. In step S218, the second module 204 returns a transfer ready message to the first module 202 confirming that the second module 204 is ready to receive data.

The writing process continues in step S220 with the first module 202 transferring data to the second module 204. In step S222, the second module 204 transfers the data directly to the memory module 208 using a remote direct memory access read response. Next, in step S224, the memory module responds to the third module 206 with a proxy remote direct memory access response indicating that the data has been received. In step S226, the third module sends a status response to the second module indicating the status of the data transfer to the memory module. The process ends in step S228 with the second module 206 sending a status message to the first module 202 passing the status of the data transfer to the memory module 208.

FIG. 3 shows a flow diagram describing a method for reading data from a memory module by passing control and data packets over separate communication paths according to an embodiment of the present invention. The process of reading data begins in step S310 with a first module 302 sending a read request to a second module. In step S312, the second module translates the read request, if necessary, and sends a read command to a third module 306. In step S314, the third module 306 sends a proxy remote direct memory access write command to a memory module 308 assigned to write the requested data. In step S320, the memory module 308 writes the data with a remote direct memory access write message to the second module 304. In step S322, the second module 304 writes the data to the first module 302.

In step S330, after sending the requested data to the second module 304, the memory module 308 notifies the third module 306 of the status of the data write to the second module 304 with a proxy remote direct memory access response. In step S332, the third module 306 passes a status report to the second module 304. In step S334, the second module 304 sends the status report to the first module.

FIG. 4 depicts a flow diagram showing a method for writing data to multiple memory modules 408A and 408B by passing control and data packets over separate communication paths according to an embodiment of the present invention. The method of writing according to an embodiment of the invention shown in FIG. 4 begins at step S410 with a first module 402 initiating a write operation by sending a write request to a second module 404. In step S412, the second module 404 translates the write request, if necessary, and sends a write command to a third module 406. In step S420, the third module 406 sends a proxy remote direct memory access read command to a first memory module 408A. In step S422, the first memory module 408A returns a remote direct memory read request to the second module 404 indicating that the first memory module 408A is ready to read data. In step S424, the second module 404 sends a transfer ready message to the first module 402.

The write process continues in step S426 where the first module 402 writes data to the second module 404. In step S428, the second module 404 sends a remote direct memory access read response with the data to the first memory module 408A. In step S430, the first memory module 408A sends a proxy remote direct memory access response to the third module 406 indicating that it has received the data.

The process according to the embodiment shown in FIG. 4 continues in step S440 with the third module 406 sending a proxy remote direct memory access read request to the second memory module 408B. In step S442, the second memory module 408B responds to the request sent in step S440 by sending a remote direct memory request to the second module 404. In step S444, the second module 404 sends a transfer ready message to the first module 402 requesting the data. In step S446, the first module 402 responds by sending the data to the second module 404. In step S448, the second module 404 sends the data to the second memory module 408B with a remote direct memory access read response. In step S450, the second memory module 408B sends a proxy remote direct memory access response to the third module 406 indicating the status of the read operation with the second module 404.

The process of writing to multiple memory modules 408A and 408B continues at step S460 with the third module 406 sending a response message to the second module 404 indicating the status of the write operations to the first memory module 408A and the second memory module 408B. In step S462, the second module 404 sends the status message to the first module providing the status of the write operations.

FIG. 5 depicts a flow diagram showing a method for reading data from multiple memory modules by passing control and data packets over separate communication paths according to an embodiment of the present invention. The method of reading from a storage server according to the embodiment of the invention shown in FIG. 5 begins with step S510 with the first module 502 sending a read request to a second module 504. In step S512, the second module 504 translates the read request, if necessary, and sends a read command to a third module 506. In step S514, the third module 506 sends a proxy remote direct memory access write request to a first memory module 508A. In step S516, the first memory module 508A sends the data to the second module 504 with a remote direct memory write message. In step S518, the second module 504 sends the data received from the first memory module 508A to the first module 502. In step S520, the first memory module 508A also sends a proxy remote direct memory access response to the third module 506 indicating the status of the data transfer.

In step S524, the third module 506 initiates a remote direct memory write instruction to a second memory module 508B. In step S526, the second memory module 508B sends the data to the second module 504 with a remote direct memory access write command. In step S528, the second module 504 sends the data to the first module 502. In step S530, the second memory module 508B sends a proxy remote direct memory access response to the third module 506 indicating the status of the data transfer. In step S540, the third module 506 sends a status response to the second module 504 indicating the status of the transfers by the memory modules 508A and 508B. In step S542, the second module 504 sends the status of the transfers to the first module 502.

In a further embodiment of the methods described above, the proxy remote direct memory access request generated by the third module conveys a number of parameters to the memory module, including R-STag (a named buffer and access privileges), remote base tagged offset (RTO), and transfer length values pertaining to the second module, and L-STag (a named buffer and access privileges), and LTO (local tagged offset) values pertaining to the memory modules, and a session identifier ("DMA SID") for handling the remote direct memory operations between the second module and the memory modules. The tuple {R-Stag, RTO, transfer length} is obtained from the command originally sent by the second module to the third module. It specifies the SCSI command context in the second module to be associated to the requested remote direct memory access operation.

According to an embodiment of the present invention, the {L-STag, LTO} tuple is provided by memory management software, which manages the allocation of memory in the memory modules for use by the first module operations. At initialization the third module instructs the memory modules to set aside a specified amount of memory to be used as data cache. The advertising of the L-STag results in permitting this memory region for external access with the memory module. The second module does not explicitly access the memory module's memory, but a gateway module connected to storage devices must have access to the memory in the memory module since it acts as a remote direct memory access responder to the gateway. The L-STag is made known by the memory module to the third module as part of the initialization process.

According to this embodiment of the present invention, the DMA-SID is a TCP session identifier, which identifies a session and connection between a memory module and a second module. At initialization, the third module instructs the memory module to establish a number of direct memory channels with each second module. The resulting session identifiers and the identity of the second module connected via the corresponding session are made known by the memory module to the third module as part of the initialization process and are subsequently used as the DMA-SIDs. Using the DMA-SIDs, the third module may instruct the memory module to issue a remote direct memory request into a particular buffer, thereby causing the memory module to conduct a remote direct memory operation with a selected second module. If more than one DMA-SID is available the third module may employ a load balancing algorithm to select the DMA-SID for the memory module.

In a further embodiment of the methods described above, the proxy remote direct memory access request generated by the third module conveys a number of parameters to the memory module, including R-key, Remote Virtual Address, Transfer Length values pertaining to the second module, and L-key, and Local Virtual Address values pertaining to the memory modules, and a remote-direct-memory-access qp-identifier ("DMA QPID") for handling the remote direct memory operations between the second module and the memory modules. The tuple {R-key, Remote Virtual Address, Transfer Length} is obtained from the command originally sent by the second module to the third module. It specifies the exchange or command in the second module to be associated to the requested direct memory operation.

According to an embodiment of the present invention, the {L-key, Local Virtual Address} tuple is provided by memory management software, which manages the allocation of memory in the memory modules for use by the first module operations. At initialization the third module instructs the memory modules to set aside a specified amount of memory to be used as data cache. The L-key and Local Virtual Address are the result of registering this memory region for external access with the memory module. The second module does not explicitly access the memory module's memory, but a gateway module connected to storage devices must have access to the memory in the memory module since it acts as a remote direct memory access responder to the gateway. The L-key and Local Virtual Address are made known by the memory module to the third module as part of the initialization process.

According to this embodiment of the present invention, the DMA-QPID is a QP identifier, which identifies a qpair between a memory module and a second module. At initialization, the third module instructs the memory module to establish a number of direct memory channels with each second module. The resulting QP identifiers and the identity of the second module connected via the corresponding QP are made known by the memory module to the third module as part of the initialization process and are subsequently used as the DMA-QPIDs. Using the DMA-QPIDs, the third module may instruct the memory module to issue a remote direct memory access request into a particular qpair, thereby causing the memory module to conduct a remote direct memory access operation with a selected second module.

When the remote direct memory access operation is finished, the memory module returns a proxy remote direct memory access response message to the third module, indicating whether the data transfer was successful. The third module must take the proxy remote direct memory access result into consideration in determining the status to be delivered back to the second module in a corresponding response message.

Turning to FIG. 6, a flow diagram is provided showing a method for writing data to a storage device according to an embodiment of the present invention. The process of writing data to a storage device begins with step S610 when a first module 602, such as a control processor, initiates a write operation by sending a write command to a second module, such as a BSG. In step S612, the second module translates the write command, if necessary, to a write request and initiates a write operation with the data storage device 608. In step S614, the data storage device returns a transfer-ready message indicating it is available to receive data. In step S616, the second module sends a remote direct memory access read request to a memory module 606, such as a data cache module, containing the data to be transfer to the data storage device 608. In step S618, the memory module 606 returns a remote direct memory access response containing the requested data to the second module 604. In step S620, the second module 604 transfers the data to the storage device 608. In step S622, the data storage device sends a status response indicating the result of the data transfer. In step S624, the second module sends a status response to the first module 602 reporting the result of the write operation.

Similarly, a further embodiment allows the second module 604 to write data as directed by the first module 602 by writing the data in multiple sections. According to this embodiment, steps S612 through S622 would be repeated for each section of data until the entire transfer had been completed. Upon the completion of the entire transfer, a status message is sent to the first module 602 in step S624.

Turning to FIG. 7, a flow diagram is provided showing a method for reading data from a storage device according to an embodiment of the present invention. The process of reading data from a storage device begins with step S710 when a first module 702, such as a control processor, initiates a read operation by sending a read command to a second module, such as a BSG. In step S712, the second module translates the read command, if necessary, to a read request and initiates a read operation with the data storage device 708. In step S714, the data storage device 708 returns the data to the second module 704. In step S716, the second module sends a remote direct memory access write command to a memory module 706, such as a data cache module, where the data is to be stored. In step S718, the storage device 708 returns a status response to the second module containing the status of the read operation. In step S720, the second module 704 sends a status response to the first module 702 reporting the result of the read operation.

As with the method for writing data to a storage device, a further embodiment allows the second module 704 to read data as directed by the first module 702 by reading the requested data in multiple sections. According to this embodiment, steps S712 through S718 are repeated for each section of data until the entire transfer has been completed. Upon the completion of the entire transfer, a status message is sent to the first module 702 in step S720.

While various embodiments of the present invention have been described in terms of a iSER and SRP it should be clear to one skilled in the art that the current invention is equally applicable to other remote direct memory based transport protocols. It will also be apparent to those skilled in the art that various modifications and variations can be made in the present invention without departing from the spirit or scope of the invention. Thus, it is intended that the present invention covers the modifications and variations of this invention provided that they come within the scope of any claims and their equivalents.

What is claimed is:

1. A networking system for processing remote direct memory operations in order to separate data and control paths comprising:
   a gateway node for receiving and responding to data requests, translating a received data request to a data command, and initiating the remote direct memory operations;
   a control processor node for initiating proxy remote direct memory operations;
   a data cache node for storing data and responding to the proxy remote direct memory operations, wherein the proxy remote direct memory operations instruct the data cache node to conduct remote direct memory operations with the gateway node;
at least one first-communication path for communicating one or more control packets between the gateway node and the control processor node;
at least one second-communication path for communicating one or more proxy remote direct memory access packets between the control processor node and the data cache node; and
at least one third-communication path for communicating one or more remote direct memory access data packets between the gateway node and the data cache node;
wherein one or more control packets generated according to the data request received by the gateway node are passed between the gateway node and the control processor node, one or more proxy direct memory access packets are passed between the control processor node and the data cache node, and one or more direct memory access data packets are passed between the data cache node and the gateway node.

2. The networking system of claim 1, wherein the one or more control packets further comprise:
a first data packet containing the data command, and the first data packet is sent to the control processor node by the gateway node; and;
a second data packet containing a status response, and the second data packet is sent to the gateway node by the control processor node.

3. The networking system of claim 1, wherein the one or more proxy remote direct memory access packets further comprise:
a proxy remote direct memory access command, based on the data command, sent to the data cache node by the control processor node; and
a proxy remote direct memory access response, based on a remote direct memory operation requested by the proxy remote direct memory access command, sent to the control processor node by the data cache node.

4. The networking system of claim 3, wherein the proxy remote direct memory access command further comprises:
an R-STag identifying a first named buffer and access privileges for the gateway node;
a first transfer offset identifying an offset location within the first named buffer;
a transfer length identifying the length of the data to be transferred;
an L-STag identifying a second named buffer and access privileges; and
a second transfer offset value identifying an offset location within the second named buffer.

5. The networking system of claim 3, wherein the proxy remote direct memory access command further comprises:
an R-Key identifying access privileges of the gateway node;
a remote virtual address identifying a starting location within a memory used by the gateway node;
a transfer length identifying the length of the data to be transferred;
an L-Key identifying the access privileges for the data cache node; and
a local virtual address identifying the starting location within a memory used by the data cache node.

6. The networking system of claim 3, wherein the proxy remote direct memory access command further comprises a qp identifier for identifying one of the third-communication paths to be associated with the remote direct memory access data packet.

7. The networking system of claim 3, wherein the proxy remote direct memory access command further comprises an exchange identifier to identify an exchange to be associated with the remote direct memory access data packet.

8. The networking system of claim 3, wherein the proxy remote direct memory access command further comprises a session identifier to identify a session and one of the third-communication paths to be associated with the remote direct memory access data packet.

9. The networking system of claim 3, wherein the remote direct memory access command contained in the first proxy packet is a proxy read command.

10. The networking system of claim 3, wherein the remote direct memory access command contained in the first proxy packet is a proxy remote direct memory access write command.

11. The networking system of claim 1, wherein the one or more proxy remote direct memory access packets further comprise a first proxy packet containing a remote direct memory access command as directed by the data command, and the first proxy packet is sent to the data cache node by the control processor node.

12. The networking system of claim 1, wherein the one or more remote direct memory access packets further comprise a data packet containing data requested by the one or more proxy remote direct memory access packets, and the data packet is sent from the data cache node to the gateway node.

13. The networking system of claim 1, wherein the one or more remote direct memory access packets further comprise:
a first data packet containing a remote direct memory access read request sent by the data cache node to the gateway node; and
a second data packet containing a direct memory access response with the data requested by the first data packet, and the second data packet is sent by the gateway node to the data cache node.

14. The networking system of claim 1, further comprising a client system interconnected with the gateway node, wherein the client system passes one or more data requests to the gateway node, and receives a status response for each of the one or more data requests from the gateway node.

15. The networking system of claim 14, wherein the one or more data requests further comprises a write request and the gateway node sends one or more transfer ready responses when ready to receive data from the client system.

16. The networking system of claim 14, wherein the one or more data requests further comprise a read request specifying requested data, and the gateway node sends one or more data responses with the requested data.

17. The networking system of claim 1, further comprising:
a storage device network for persistent storage of data; and
a second gateway interconnected with the storage device network, wherein the second gateway translates communications between the storage device network and the control processor node and the data cache node.

* * * * *